US012151506B2

(12) United States Patent
Chen

(10) Patent No.: US 12,151,506 B2
(45) Date of Patent: Nov. 26, 2024

(54) RECIPROCAL VIBRATION TYPE ELECTRIC ENGRAVING PEN

(71) Applicant: NEW REN YANG ENTERPRISE CORP., Taichung (TW)

(72) Inventor: Yueh-Ting Chen, Taichung (TW)

(73) Assignee: NEW REN YANG ENTERPRISE CORP., Taichung (TW)

( * ) Notice: Subject to any disclaimer, the term of this patent is extended or adjusted under 35 U.S.C. 154(b) by 0 days.

(21) Appl. No.: 18/346,646

(22) Filed: Jul. 3, 2023

(65) Prior Publication Data

US 2024/0343059 A1 Oct. 17, 2024

(30) Foreign Application Priority Data

Apr. 14, 2023 (TW) ................................ 112203502

(51) Int. Cl.
*B44B 3/00* (2006.01)
*B44B 3/06* (2006.01)

(52) U.S. Cl.
CPC .............. *B44B 3/005* (2013.01); *B44B 3/063* (2013.01)

(58) Field of Classification Search
CPC ................................ B44B 3/006; B44B 3/005
See application file for complete search history.

(56) References Cited

U.S. PATENT DOCUMENTS 2,810,960 A * 10/1957 Johnson .................. B44B 3/061 33/18.1
9,079,286 B1 * 7/2015 DeCamillis ............ B25D 17/08
10,926,577 B1 * 2/2021 DeCamillis ............. B44B 11/02
2001/0048092 A1 * 12/2001 Wiklund ................. B44B 3/005 251/341
2009/0295104 A1 * 12/2009 Cover ...................... B25G 3/26 279/83

FOREIGN PATENT DOCUMENTS

CN 106514466 A * 3/2017
CN 107804098 A * 3/2018
CN 109466220 A * 3/2019 ............. B44B 3/005
CN 112590438 A * 4/2021 ............... B44B 1/00
CN 112606610 A * 4/2021 ............... B27C 5/00
CN 112895787 A * 6/2021
CN 113927430 A * 1/2022
DE 102018120739 A1 * 3/2019 ............... B44B 3/02
SE 452577 B * 12/1987 ............... B44B 3/00
WO WO-03028958 A1 * 4/2003 ........... B25D 11/102

* cited by examiner

*Primary Examiner* — Lucas E. A. Palmer
(74) *Attorney, Agent, or Firm* — MUNCY, GEISSLER, OLDS & LOWE, P.C.

(57) ABSTRACT

The present invention provides a reciprocal vibration type electric engraving pen driven by a main transmission shaft to operate. The engraving pen contains a rear shell assembled with a front shell. The rear shell positions the main transmission shaft. A top front of the driving shaft is assembled with an off-centered driving bead, and the front shell is assembled with a driven shaft. The engraving pen is characterized in that a rear end of the driven shaft is assembled radially with a driven pillar, and the driving shaft is formed integrally with a connection barrel. Accordingly, when the main transmission shaft drives the driving shaft to rotate, the driving bead revolves on a circular track simultaneously. When the driving bead revolves by one turn, the driven pillar is hit twice and vibrates double times. Furthermore, the driven shaft can rotate clockwise and counterclockwise, and the lifetime is extended.

11 Claims, 13 Drawing Sheets

RECIPROCAL VIBRATION TYPE ELECTRIC ENGRAVING PEN

BACKGROUND OF THE INVENTION

(a) Field of the Invention

The present invention relates to a reciprocal vibration type electric engraving pen, and more particularly to a reciprocal vibration type electric engraving pen that the number of double vibration of a driven shaft can be increased, and a driving shaft is integrally formed with a connection barrel without adaptation, so that the assembly is simple and precise without resulting in imbalance, over vibration and high temperature. In addition, when the engraving pen operates clockwise and counterclockwise under a same rotation speed, the loss can be decreased, thereby doubling the lifetime of a driven pillar and a driving bead. Furthermore, when the engraving pen operates, the output power is more stabilized, so that the power of processing is accurate. Moreover, the position at which a spring is assembled can be changed. Accordingly, the function of all-time vibration or half-time vibration that the engraving pen vibrates only when an object is pressed can be achieved.

(b) Description of the Prior Art

It is known that a conventional reciprocal vibration type electric engraving pen is applied to the processing of wood, jewelry, glass, leather, the house repairing and the processing of a small workpiece, performing engraving, grinding, cutting, cleaning, polishing and sand milling. Therefore, the engraving pen is an indispensable tool in technology industry. As shown in FIG. 1 and FIG. 2, an engraving pen 20 is driven by a main transmission shaft 10 with power. The main transmission shaft 10 contains an axle center 11 and the axle center 11 is driven by a motor. The engraving pen 20 includes a shell 21, a connection barrel 22, a binding rod 23, a rotating shaft 24, an inner barrel 25, a driven shaft 26, a spring 27, a top assembly liner 28, an inner assembly sleeve 281, a sleeve barrel 293, a buffer seat 29 and an adjustable clip 200. The shell 21 is disposed outside and is a hollow cylinder for enclosing and containing all parts. A rear end of the shell 21 is converged a little, so that the connection barrel 22 will not move outward after assembly. The connection barrel 22 is provided with a section of external thread 221 to assemble the inner barrel 25, so that the connection barrel 22 and the inner barrel 25 can be all assembled in the shell 21. A C-shaped reed 12 encloses the connection barrel 22 and is provided with a small hole 121. The connection barrel 22 is provided with a positioning slot 222, the positioning slot 222 contains a steel ball 223, an outer surface of the main transmission shaft 10 is provided with a hole slot 101, and the steel ball 223 is disposed in the positioning slot 222. The steel ball 223 is limited by the small hole 121 of the C-shaped reed 12 and cannot move outward. The steel ball 223 can be locked in the hole slot 101 of the main transmission shaft 10. The C-shaped reed 12 is provided with an elastic force to expand and restore, allowing the main transmission shaft 10 to be engaged with the connection barrel 22 quickly. The binding rod 23 is disposed in the connection barrel 22, a bearing 231 is disposed between the binding rod 23 and the connection barrel 22, a surface of the axle center 11 at a front end of the main transmission shaft 10 is provided with an axial rib 111, a rear end of the binding rod 23 is provided with a rabbet 232, the axle center 11 enters in the rear end of the binding rod 23, and then the axial rib 111 enters in the rabbet 232, so that when the axle center 11 of the main transmission shaft 10 rotates, the binding rod 23 will be driven to rotate as well. A front end of the binding rod 23 is provided with an inner combination groove 233, an inner wall of the inner combination groove 233 is provided with an internal thread 234, a rear end of the rotating shaft 24 is assembled in the inner combination groove 233, a thrust bearing 241 and a bearing 242 are disposed between the rotating shaft 24 and the connection barrel 22, the thrust bearing 241 and the bearing 242 are all sheathed on the rotating shaft 24, and a top front of the rotating shaft 24 is provided with a notch 243. A driving bead 244 is disposed in the notch 243, and a pillar 245 is transfixed into the notch 243 and the driving bead 244 to assemble the driving bead 244 in the notch 243. The driven shaft 26 is disposed in the inner barrel 25, the top assembly liner 28 is provided with an external thread and is assembled at a front end inside the inner barrel 25. The inner assembly sleeve 281 is disposed at a rear side of the top assembly liner 28 to pivot the driven shaft 26 in the inner barrel 25. The buffer seat 29 is disposed between the driven shaft 26 and the inner barrel 25, an exterior of the driven shaft 26 is fixed with a guard ring 261 and two bumps 262. Relative to the buffer seat 29, the guard ring 261 is disposed at front, and is provided with a spring 27 which is sheathed on the driven shaft 26. A top front surface 291 of the buffer seat 29 and the guard ring 261 provide for abutting the spring 27, the sleeve barrel 293 is disposed at a rear side of the buffer seat 29, and the buffer seat 29 is provided with two chutes 292. The two bumps 262 of the driven shaft 26 are disposed respectively in each chute 292, so that the driven shaft 26 is limited without rotation but can only move forward and backward. A rear end of the driven shaft 26 is provided with a groove 263, a driven bead 264 enters in the groove 263, and a pillar 265 is transfixed into the groove 263 and the driven bead 264 to assemble the driven bead 264 in the groove 263. The driven bead 264 can be touched by the driving bead 244, and a most front end of the driven shaft 26 is provided with a chuck 266. The chuck 266 is engaged with a thread of the adjustable clip 200, and the adjustable clip 200 is rotated to adjust the inner diameter of the chuck 266, so as to hold and position a cutlery (including processing tool used for engraving, grinding, cutting, cleaning, polishing, and sand milling). If a front end of the driven shaft 26 moves backward a little by a push force (when the cutlery touches a processing object), the driven bead 264 can touch the driving bead 244 in rotation; whereas, when the driven bead 264 does not touch the driving bead 244, the driven shaft 26 will be restored to its original position by the elastic force.

Referring to FIG. 2, FIG. 3, FIG. 4, and FIG. 5, when the conventional reciprocal vibration type electric engraving pen 20 operates, a motor is activated to rotate the axle center 11 of the main transmission shaft 10, the axle center 11 rotates the binding rod 23, and then the binding rod 23 drives the rotating shaft 24 to rotate. When the rotating shaft 24 rotates, the driving bead 244 at the top front of the rotating shaft 24 revolves in a circle; whereas when the cutlery presses on an object, the driven shaft 26 will move backward a little, so that the driving bead 244 can hit the driven bead 264 of the driven shaft 26 once each time the driving bead 244 revolves by one turn, allowing the driven shaft 26 to move forward a little. The driven shaft 26 is then restored to its original position by the elastic force, which results in a quick reciprocal vibration effect to the cutlery (or processing tool). This means that each time the axle center 11 of the main transmission shaft 10 revolves by one turn to drive the driven shaft 26 to reciprocate once, the cutlery will also reciprocate once. A conventional motor rotates by several thousand turns per minute to fifteen thousand turns per minute, and therefore the conventional cutlery can only output the vibration at several thousand reciprocations per minute to fifteen thousand reciprocations per minute, thereby engraving, grinding, cutting, cleaning, polishing, and sand milling the processing object.

The conventional reciprocal vibration type electric engraving pen is provided with the following shortcomings that:

1. The manufacturing process and assembly of the binding rod 23 and the rotating shaft 23 are tedious, and as the rotating shaft 24 is adapted to the binding rod 23 by the thread, there will be imbalance, too much vibration and over-heating.
2. As the rotating shaft 24 is adapted by the thread, it can only rotate in one direction; if the rotating shaft 24 operates counterclockwise, the thread will get loose and be damaged that the rotating shaft 24 cannot be used.
3. The driving part and the driven part can only operate in one direction, and as the driving bead 244 can only scratch and wear the driven bead 264 at a fixed point in one direction repeatedly, the lifetime will be shorter.
4. In terms of the structure of the driving bead 244 relative to the driven bead 264, when the driving bead 244 operates by one turn, the cutlery will be hit and vibrate only once. If the rotation speed of the motor is 12,000 turns/min., then the maximum output can only be 12,000 times of vibration per minute and cannot be higher.
5. When the driving bead 244 of the driving part is assembled with the driven bead 264 of the driven part, there will be a free gap, which causes the vibration to be fluctuating and unstable that the vibration will not be accurate, and the amplitude of vibration of the cutlery will be decreased. Therefore, the vibration and processing power to the object will be insufficient.
6. Only when the driven shaft 26 puts pressure inward that the power can operate, which means that if the cutlery (processing tool) in front of the driven shaft 26 does not put pressure on the object, then the driving bead 244 will not touch the driven bead 264, and the driving bead 244 will revolve idly. Therefore, the cutlery cannot have the all-time vibration function but a single vibration function only when the cutlery applies pressure to the object (it is called the half-time vibration in short).

On the other hand, a conventional rotating shaft (the driving part) is changed into a cam, and the driven part is changed into a cylinder; whereas, a stud is disposed in front of the rotating shaft, and a front end of the stud is a slope. The slope of the cam hits the cylinder, and as the contact area between the slope of the stud and the cylinder is large, the loss will be quite large and the rotating shaft cannot rotate counterclockwise.

SUMMARY OF THE INVENTION

Accordingly, the present invention discloses a reciprocal vibration type electric engraving pen, wherein a main transmission shaft drives an engraving pen to operate. The engraving pen comprises primarily:

- a rear shell, which is assembled with a front shell and is a hollow cylinder, with a rear end of the rear shell providing for a main transmission shaft to be positioned quickly, and an interior of the rear shell being assembled with a driving shaft, a first bearing, a second bearing, a collar, a small bearing and a C-shaped snap ring; with the driving shaft being transfixed respectively into the first bearing, the second bearing, the collar, the small bearing and the C-shaped snap ring; with a rear end of the driving shaft being a connection barrel to connect the main transmission shaft, a top front of the driving shaft being assembled with a driving bead, and the driving bead being off-centered on the top front of the driving shaft; and
- a front shell, which is a hollow cylinder and an interior of which is assembled with a buffer seat, a driven shaft, a spring, and a top assembly liner respectively, with the top assembly liner being assembled at a front end of the front shell to position the driven shaft in the front shell, a position of the driven shaft providing for abutting the spring, and a front end of the driven shaft being a chuck.

The engraving pen is characterized in that a rear end of the driven shaft is assembled with a driven pillar, the driven pillar is radially arranged on the rear end of the driven shaft, the driven shaft provides for touching the driving bead at the front of the driving shaft, the driving shaft and the connection barrel are integrally formed, and the driving shaft is driven directly by the main transmission shaft to rotate.

By the assembly of abovementioned structures, when the main transmission shaft drives the driving shaft to rotate, the driving bead will revolve on a circular track at the same time; whereas when the driven shaft is at a withdraw position, the driving bead can hit the driven pillar twice while revolving by one turn, thereby achieving the object of double vibration for the driven shaft.

The primary object of the present invention is to provide a double vibration effect that under a same rotation speed, when the driving bead rotates by one turn relative to the driven pillar, two times of hitting and scratching will be resulted, which doubles the efficiency and improves the conventional engraving pen that only a same maximum amplitude can be achieved at the same rotation speed. In addition, when the driving bead rotates clockwise and counterclockwise at the same rotation speed, the loss between the driving bead and the driven pillar can be decreased.

Another object of the present invention is to provide the driving bead (steel ball) as the driving part, and the driven pillar (steel pillar) as the driven part, such that even there will be a little free gap when the driving part takes the design of driving bead, as the driven part is the driven pillar that is stable and immobilized, the output power can be more stable when the driven pillar operates. As the output power is stable and accurate, the amplitude is stable without reduction, and the processing power is accurate.

Still another object of the present invention is to provide a feature that the driving shaft and the connection barrel are integrally formed without adaptation in manufacturing, so that the entire manufacturing is improved, and the assembly is simple and precise. Therefore, there will be no imbalance, too much vibration and over-heating in operation.

Yet another object of the present invention is to provide a feature that by changing the position at which the spring is assembled, the operation can have a different effect, including an implementation plan that the operation is resulted only when the driven part is given an inward pressure (half-time vibration), and the operation is resulted when the driving part and the driven part are given an all-time pressure (all-time vibration) if the spring is assembled at a different position. In this way, the engraving pen can be used for filing and grinding, achieving the double effect of all-time operation and half-time operation.

Still yet another object of the present invention is to provide a feature that the driving part hits the driven part in a point-to-point manner, therefore, the friction is small, the loss rate is small, and the lifetime is long.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
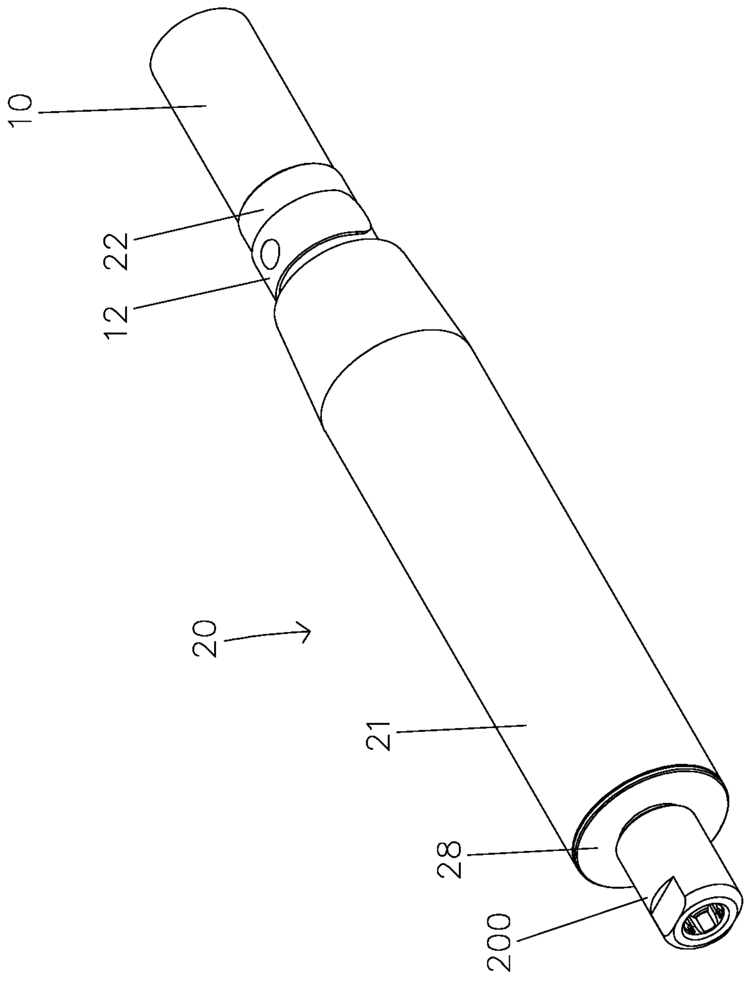
FIG. 1 Prior Art
FIG. 1 shows a three-dimensional assembly view of a conventional reciprocal vibration type electric engraving pen.
Figure 2:
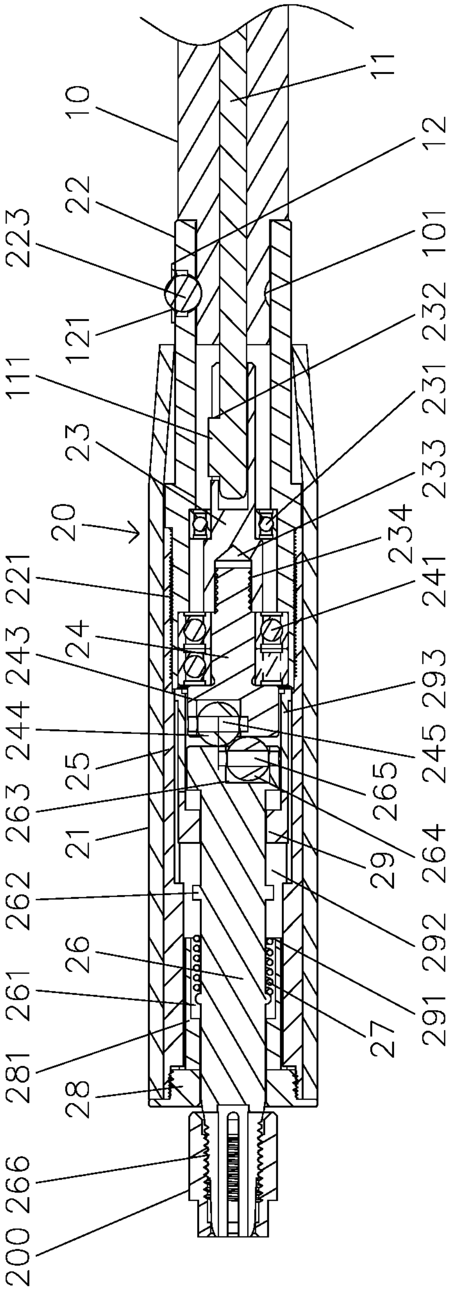
FIG. 2 Prior Art
FIG. 2 shows a cutaway view of the conventional reciprocal vibration type electric engraving pen, wherein a driven shaft moves backward.
Figure 3:
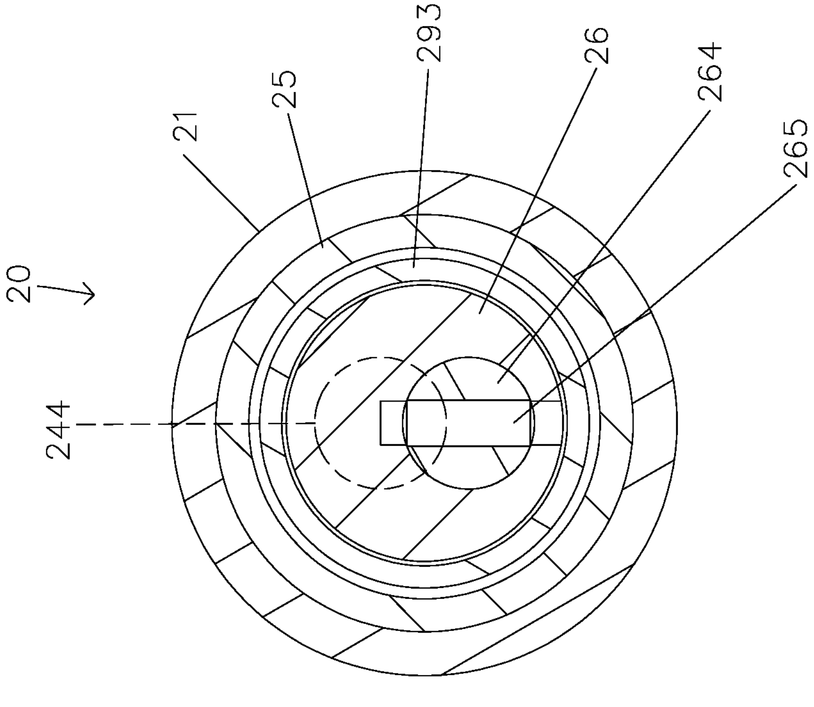
FIG. 3 Prior Art
FIG. 3 shows a cutaway view of the conventional reciprocal vibration type electric engraving pen, wherein a driving bead does not hit a driven pillar.
Figure 4:
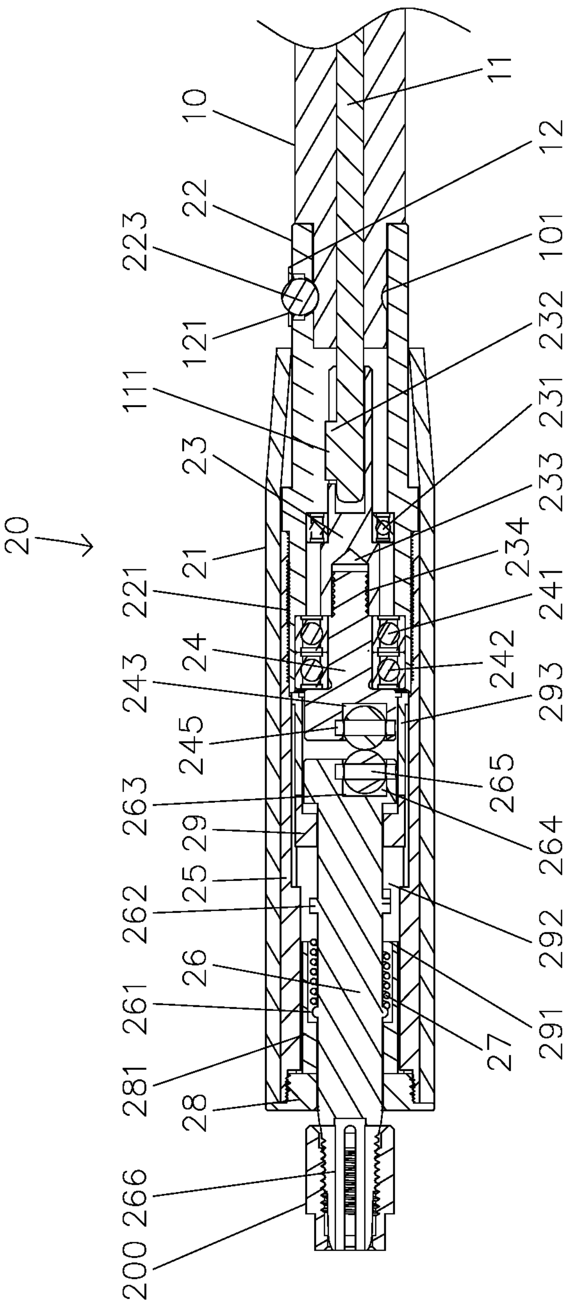
FIG. 4 Prior Art
FIG. 4 shows a cutaway view of the conventional reciprocal vibration type electric engraving pen, wherein the driven shaft moves forward.
Figure 5:
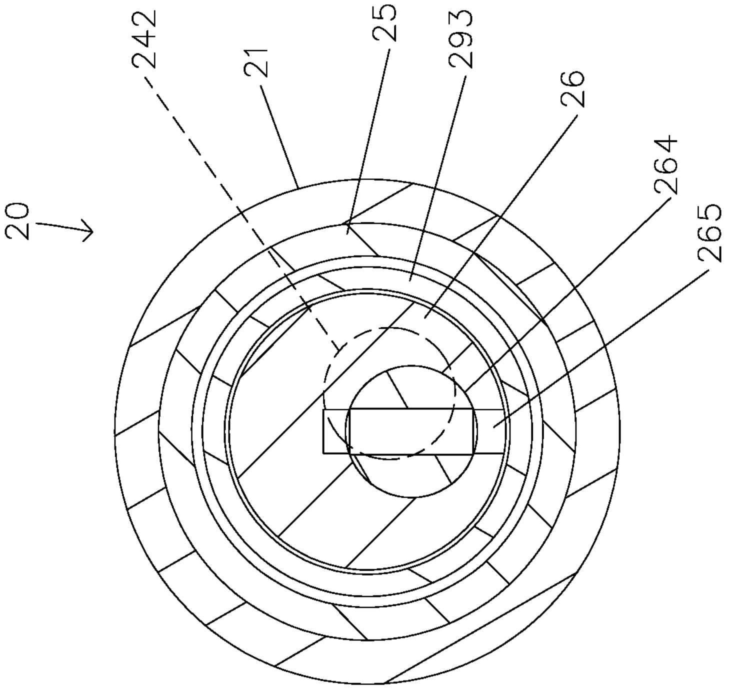
FIG. 5 Prior Art
FIG. 5 shows a cutaway view of the conventional reciprocal vibration type electric engraving pen, wherein the driving bead hits the driven pillar.
Figure 6:
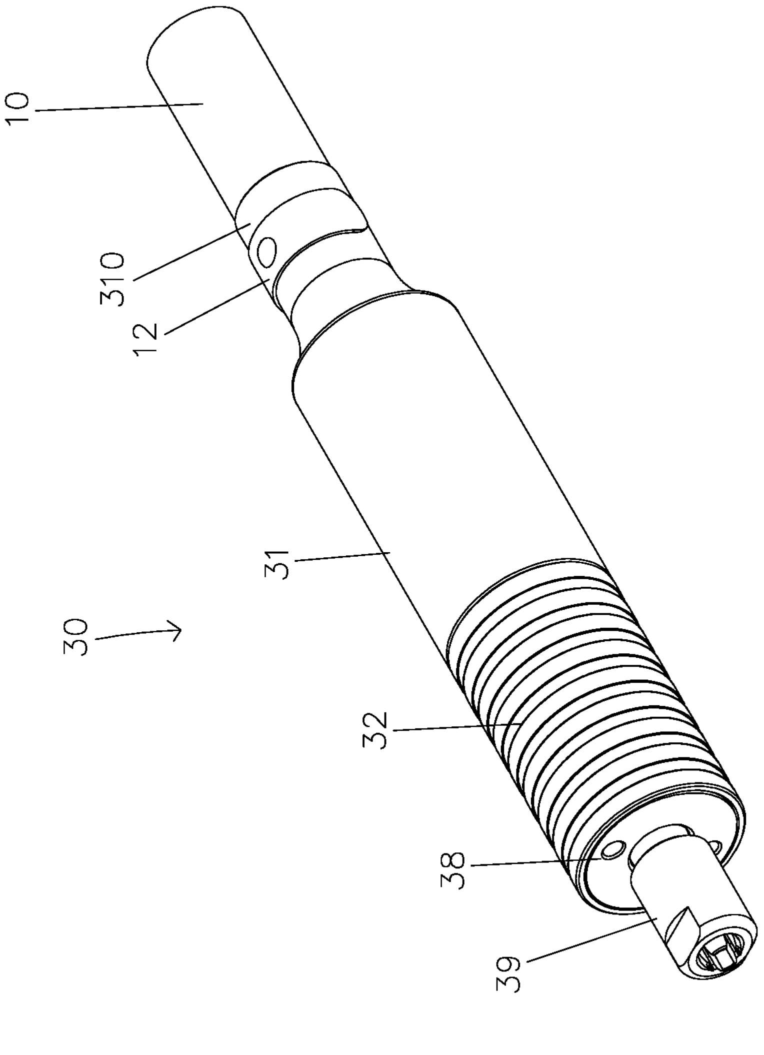
FIG. 6 shows a three-dimensional assembly view of the present invention.
Figure 7:
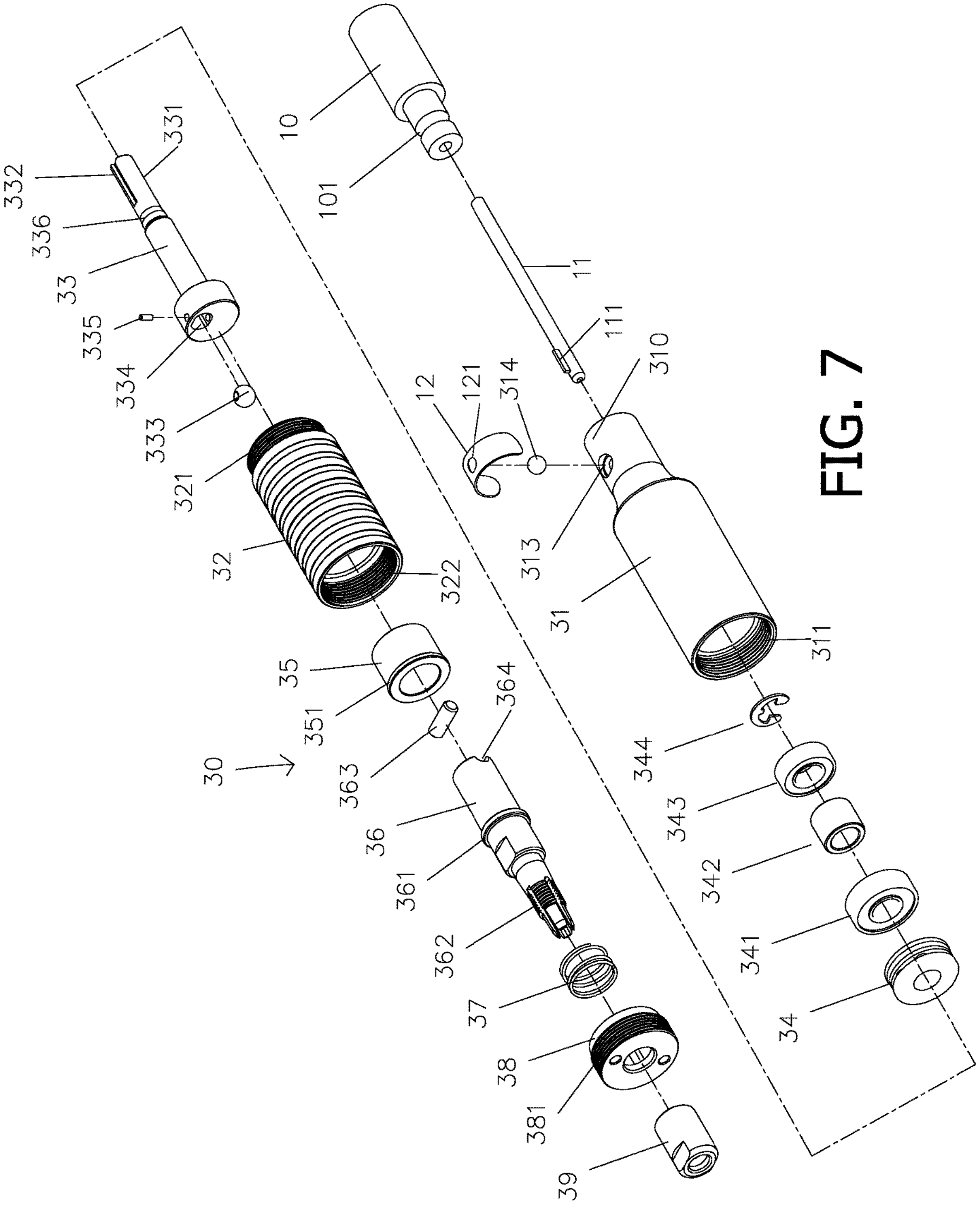
FIG. 7 shows a three-dimensional exploded view of the present invention.
Figure 8:
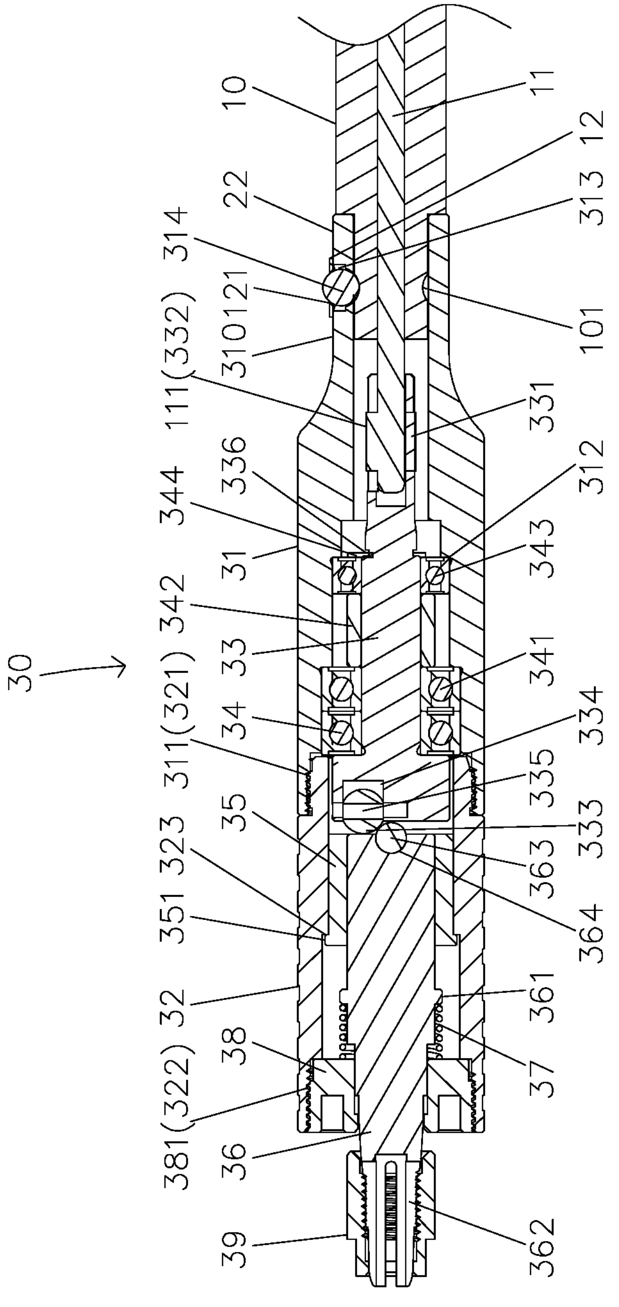
FIG. 8 shows a cutaway view of the present invention, wherein a spring is disposed between a convex ring and a top assembly liner.

Referring to FIG. 6, FIG. 7, and FIG. 8 for a first embodiment of the present invention, a main transmission shaft 10 drives an engraving pen 30 to operate, an interior of the main transmission shaft 10 is provided with an axle center 11 (can be a conventional design), and the axle center 11 is driven by a motor (the motor and the main transmission shaft 10 belong to the conventional technology). The engraving pen 30 comprises primarily a rear shell 31, a front shell 32, a driving shaft 33, a first bearing 34, a second bearing 341, a collar 342, a small bearing 343, a C-shaped snap ring 344, a buffer seat 35, a driven shaft 36, a spring 37, a top assembly liner 38, and an adjustment clip 39. The rear shell 31 is assembled with the front shell 32. An inner wall at front of the rear shell 31 is provided with an internal thread 311, an outer wall at rear of the front shell 32 is provided with an external thread 321, an inner wall at front of the front shell 32 is provided with an internal thread 322, and the internal thread 311 at front of the rear shell 31 is assembled with the external thread 321 at rear of the front shell 32. The rear shell 31 is a hollow cylinder, a converged portion 310 is disposed near the rear end of the rear shell 31, the converged portion 310 is provided with a positioning slot 313, and the positioning slot 313 contains a steel ball 314. A C-shaped reed 12 encloses the converged portion 310 of a connection barrel 331, and is provided with a small hole 121. An outer surface of the main transmission shaft 10 is provided with a hole slot 101, and the steel ball 314 is positioned in positioning slot 313. The steel ball 314 is also limited by the small hole 121 of the C-shaped reed 12 without moving outward, and can be locked in the hole slot 101 of the main transmission shaft 10. The C-shaped reed 12 is provided with an elastic force to expand and restore, allowing the converged portion 310 at the rear end of the rear shell 31 to rapidly position the main transmission shaft 10 (the rapid position belongs to the conventional technology). An interior of the main transmission shaft 10 is provided with a rotating axle center 11. An interior of the rear shell 31 is assembled with the driving shaft 33, the first bearing 34, the second bearing 341, the collar 342, the small bearing 343, and the C-shaped snap ring 344. A rear end of the driving shaft 33 is provided with the connection barrel 331 for connecting the axle center 11 of the main transmission shaft 10. The driving shaft 33 and the connection barrel 331 are integrally formed. An interior of the connection barrel 331 is provided with a locking slot 332, a periphery at front of the axle center 11 of the main transmission shaft 10 is provided with an axial rib 111, and the axial rib 111 is latched in the locking slot 332 for engaging, so that the driving shaft 33 can be driven directly by the axle center 11 of the main transmission shaft 10 to rotate. A top front of the driving shaft 33 is assembled with a driving bead 333, the driving bead 333 is off-centered on the top front of the driving shaft 33, and the top front of the driving shaft 33 is provided with a round groove 334. The round groove 334 provides for the driving bead 333 to enter, and a periphery at front of the driving shaft 33 is inserted with a stake 335. The stake 335 is transfixed into the round groove 334 and the driving bead 333 to position the driving bead 333 in the round groove 334. The inner wall of the rear shell 31 is provided with a baffle ring 312 to abut the small bearing 343, the driving shaft 33 is provided with a ring groove 336, and the C-shaped snap ring 344 is snapped in the ring groove 336 of the driving shaft 33. The C-shaped snap ring 344 and the collar 342 are used to position the small bearing 343, the first bearing 34 and the second bearing 341.

The front shell 32 is a hollow cylinder, and its surface is provided with a corrugated mark to increase the holding power of a user's fingers. An interior of the front shell 32 is assembled respectively with the buffer seat 35, the driven shaft 36, the spring 37, and the top assembly liner 38. The top assembly liner 38 is assembled at a front end in the front shell 32, and positions the driven shaft 36 in the front shell 32. A front end of the driven shaft 36 is a chuck 362, an outer periphery of the top assembly liner 38 is provided with an external thread 381, and the inner thread 322 on the inner wall at front of the front shell 32 provides for assembling with the external thread 381 of the top assembly liner 38. A rear end of the driven shaft 36 is assembled with a driven pillar 363, the rear end of the driven shaft 36 is provided radially with a semi-circular groove 364, the semi-circular groove 364 provides for emplacing the driven pillar 363, and the dimeter of the opening of the semi-circular groove 364 is smaller than the diameter of the driven pillar 363. The driven pillar 363 enters in the driven shaft 36 from a side of the semi-circular groove 364 and is steady without sloshing freely. The driven pillar 363 is radially arranged on the rear end of the driven shaft 36, and can provide for touching the driving bead 333 at front of the driving shaft 33. An inner wall of the front shell 32 is provided with a flange ring 323, the buffer seat 35 is a cylinder and is provided with a head cover 351, and the head cover 351 can be abutted on the flange ring 323. A convex ring 361 is disposed on the driven shaft 36 at a location close to the top assembly liner 38, the convex ring 361 provides for abutting the spring 37, and the spring 37 can be disposed between the convex ring 361 and the top assembly liner 38, providing the driven shaft 36 with a backward elastic force (if the spring 37 is disposed between the convex ring 361 and the head cover 351 of the buffer seat 35, then the spring 37 can provide the driven shaft 36 with a forward elastic force, which is another embodiment to be described later). The diameter of the chuck 362 at front of the driven shaft 36 is controlled by the adjustment clip 39; the chuck 362 is provided with an external thread, and the adjustment clip 39 is provided with an internal thread to rotate the adjustment clip 39, thereby controlling the diameter of the chuck 362.

Figure 9:
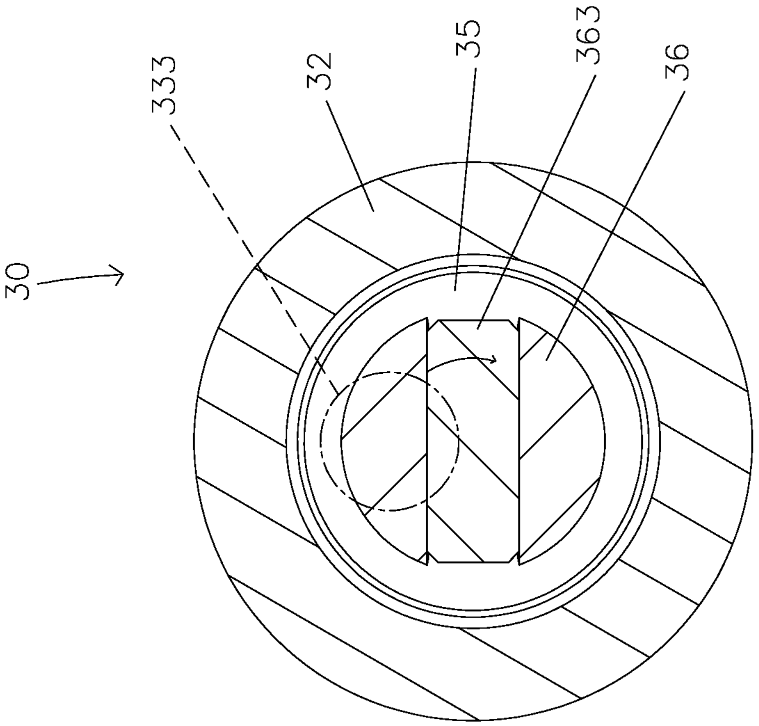
FIG. 9 shows a cutaway view of the present invention, wherein a driving bead touches a rear end of a driven shaft.
Figure 10:
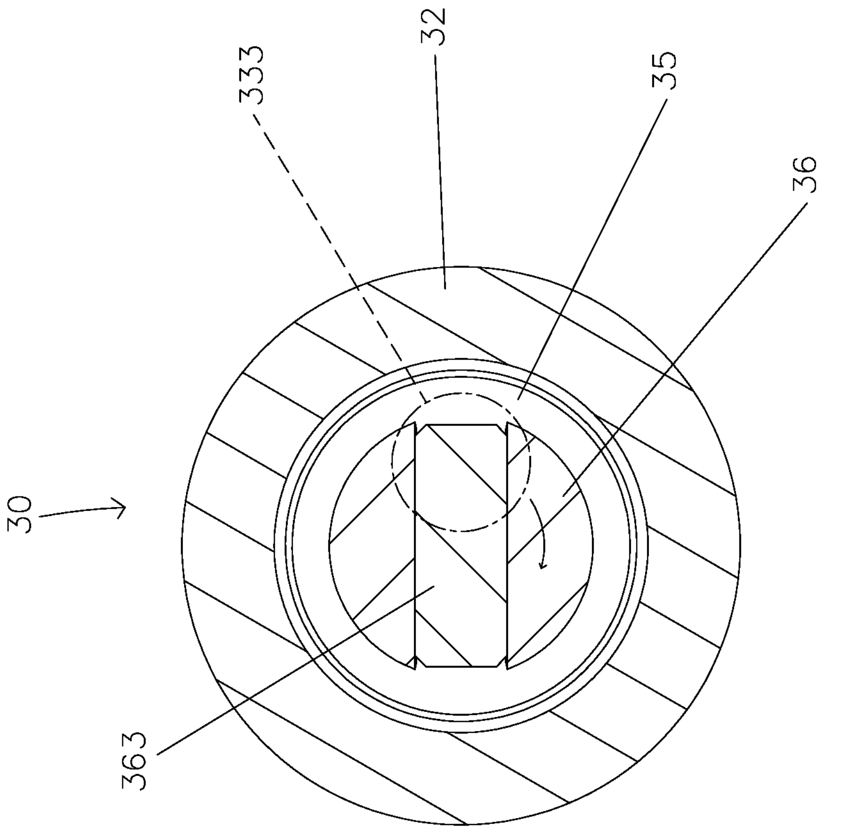
FIG. 10 shows a cutaway view of the present invention, wherein the driving bead hits a right side of a driven pillar.
Figure 11:
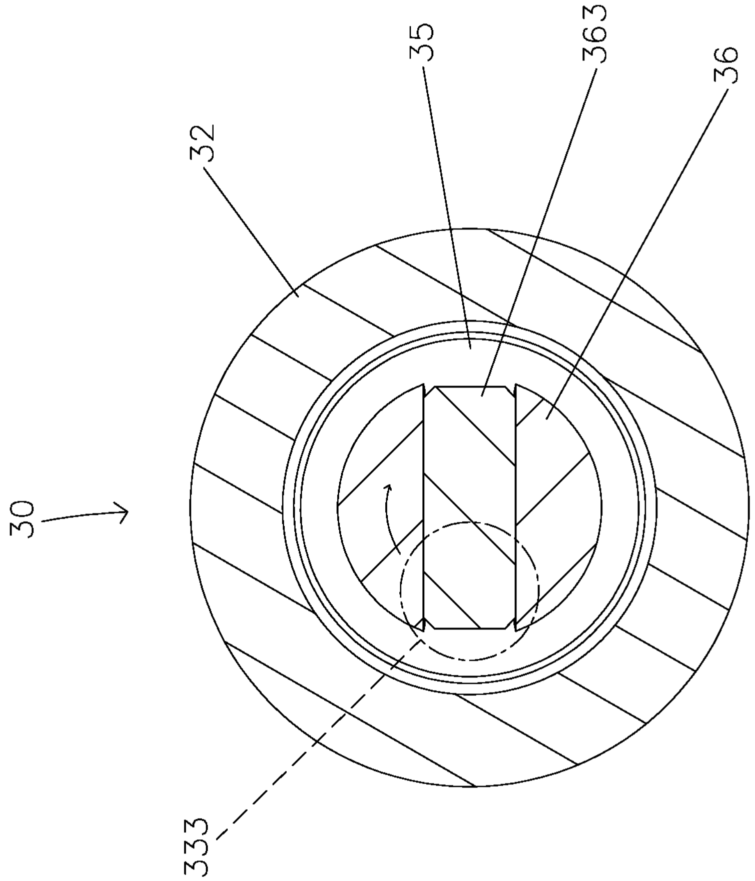
FIG. 11 shows a cutaway view of the present invention, wherein the driving bead hits a left side of the driven pillar.
Figure 12:
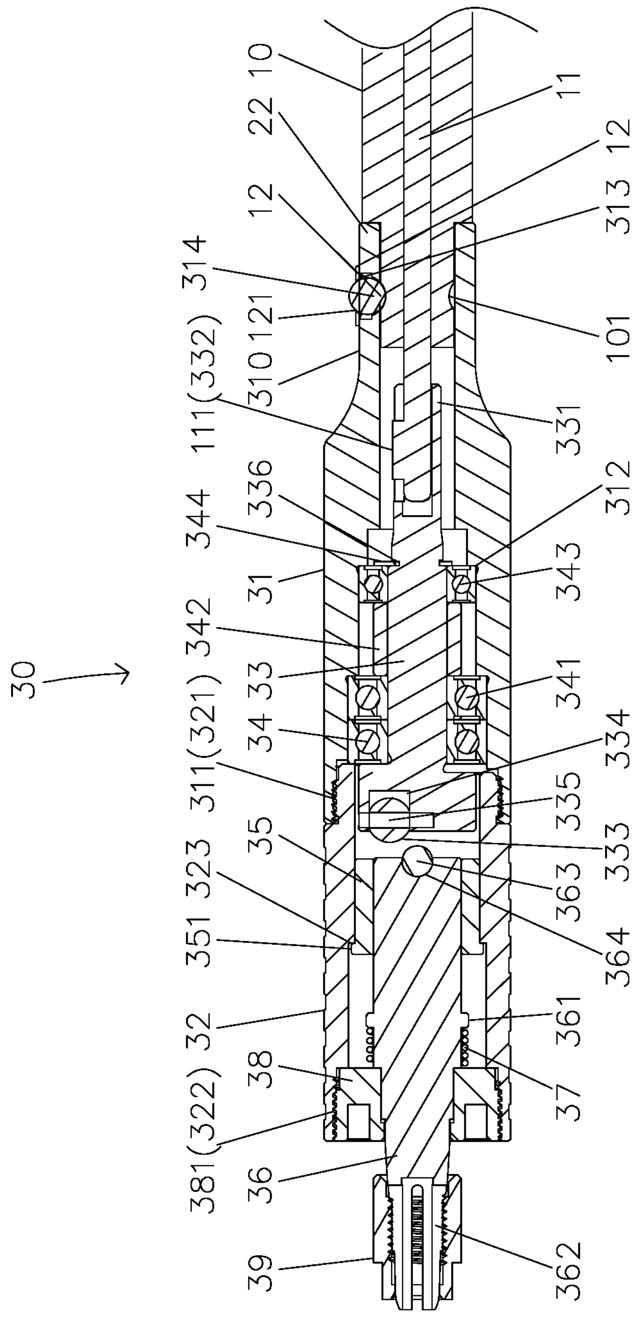
FIG. 12 shows a cutaway view of the present invention, wherein a driven shaft moves forward a little.

By the abovementioned structures, a first embodiment of the present invention is shown in FIG. 7, FIG. 8, and FIG. 9, which is an all-time vibration mode. In operation, a cutlery is first inserted into the chuck 362. The adjustment clip 39 is rotated to shrink the diameter of chuck 362 to tighten the cutlery, and then the axle center 11 of the main transmission shaft 10 is assembled in the connection barrel 331 of the driving shaft 33 (belongs to the conventional technology). At this time, the driving bead 333 touches the rear end of the driven shaft 36 (as the spring 37 is assembled between the convex ring 361 and the top assembly liner 38 to provide the driven shaft 36 with the backward elastic force, the rear end of the driven shaft 36 will touch the driving bead 333 at all time, as shown in FIG. 8 and FIG. 9), and then the motor is activated. The axle center 11 of the main transmission shaft 10 drives the driving shaft 33 to rotate, the driving bead 333 on the top front of the driving shaft 33 follows the driving shaft 33 to rotate and revolve along a circular track, and when the driving bead 333 moves, it will hit a right side of the driven pillar 363 (as shown in FIG. 10). The driven pillar 363 drives simultaneously the driven shaft 36 and the cutlery to move forward a little (as shown in FIG. 12). When the driving bead 333 skips the driven pillar 363 and does act force onto the driven shaft 36, the driven shaft 36 will move backward a little by the elastic force of the spring 37, and then the driving bead 333 will touch the rear end of the driven shaft 36 again, waiting to revolve and hit a left side of the driven pillar 363 for a next time (as shown in FIG. 11). Accordingly, when the driving bead 333 revolves by one turn, it can hit the driven pillar 363 twice, and therefore, the driven shaft 36 is provided with a double vibration effect.

The driving shaft 33 and the connection barrel 331 are formed integrally without connection with a thread. Therefore, there is no issue that the driving shaft gets loose from the connection barrel as the conventional technology. In addition, there are no issues of sloshing, imbalance, and over-heating due to the loosening problem. Furthermore, there is also no issue like the conventional technology that it can only rotate clockwise without counterclockwise. As the driving shaft 33 and the connection barrel 331 are formed integrally in manufacturing, the assembly can be simple and precise.

Figure 13:
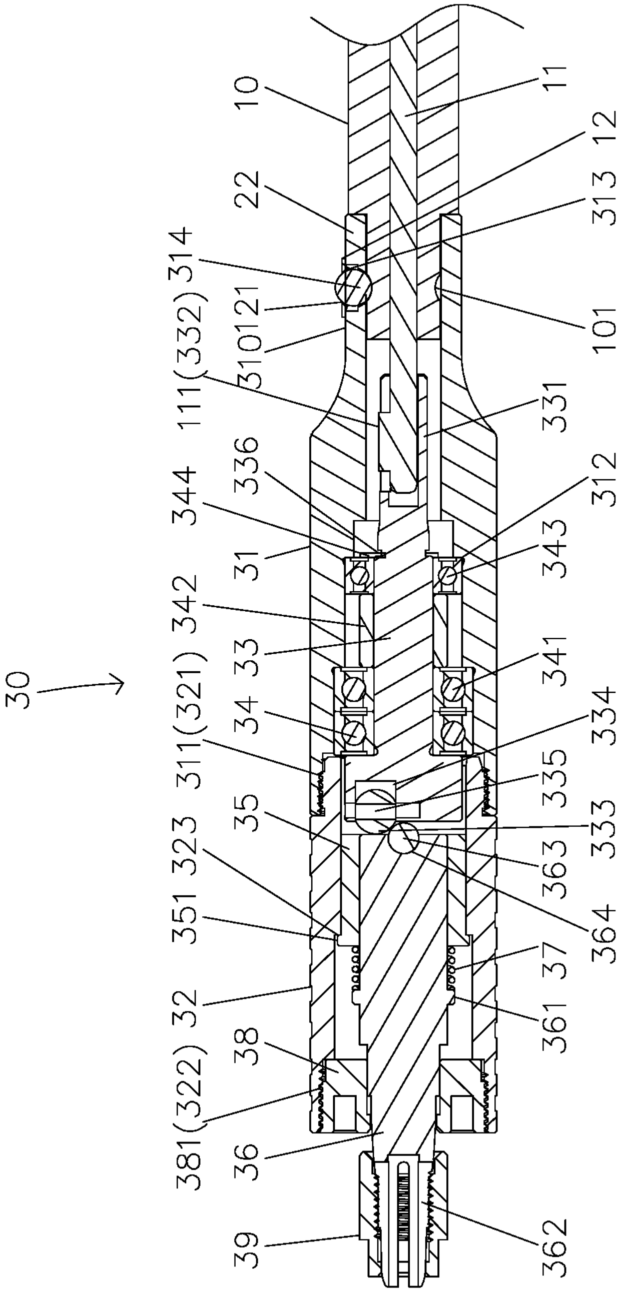
FIG. 13 shows a cutaway view of another embodiment of the present invention, wherein the spring is disposed between the convex ring and a head cover of a buffer seat.

Referring to FIG. 13, it shows a second embodiment of the present invention, which is a half-time vibration mode. The spring 37 is assembled between the convex ring 361 of the driven shaft 36 and the head cover 351 of the buffer seat 35. The spring 37 provides the driven shaft 36 with a forward elastic force. When the cutlery does not apply pressure to an object, the rear end of the driven shaft 36 will not touch the driving bead 333. When a user's hand uses the cutlery to apply force to the object, the driven shaft 36 will move backward a little, allowing the rear end of the driven shaft 36 to touch the driving bead 333. When the driving bead 333 rotates, the driving bead 333 will hit the driven pillar 363. At this time, the engraving pen can operate as the abovementioned implementation method to vibrate the driven shaft 36 and the cutlery to work.

The present invention is provided with the following advantages:

1. The driving shaft 33 and the connection barrel 331 are formed integrally in manufacturing without adaptation with the thread. The entire manufacturing is improved and the assembly is simple and precise. Therefore, there will be no imbalance, too much vibration and over-heating in operation.
2. As the driving part (the driving shaft 33 and the connection barrel 331) are formed integrally in design, it can rotate clockwise and counterclockwise and the driving shaft 33 will not get loose from the connection barrel 331. In addition, a counterclockwise rotation can be added to the operation. As a different friction point loss can be resulted by the operation in a different direction (the friction point in clockwise rotation is different from the friction point in counterclockwise rotation), there will be no single point loss (steel ball to steel ball) as in the convention technology. Therefore, under a same rotation speed, the lifetime of the driven pillar 363 and the driving bead 333 can be doubled.
3. The driving part in the present invention is the driving bead 333 (steel ball), and the driven part is the driven pillar 363 (steel pillar). Therefore, even there is a little free gap in assembling the driving bead 333, as the driven pillar 363 is steady and immobilized, the output power will be more accurate and stable when the driven pillar 363 operates by one turn. As the output power is accurate and stable, the amplitude is steady without decreasing, and the processing power is accurate.
4. In the same rotation speed, when the driving bead 333 rotates by one turn relative to the driven pillar 363 to result in two times of friction operation by hitting, the efficiency will be doubled. When the driving bead 333 revolves by one turn, the driving pillar 363 can be hit twice, achieving the effect of double vibration of the driven shaft 36 (in the present invention, the motor output is 12,000 turns per minute, and then the driven shaft can achieve 24,000 times of vibration per minute). Therefore, the shortcomings in the conventional technology that the cutlery can only achieve the maximum but same rotation speed as the rotation speed of the motor, and the amplitude will still decrease (insufficient) can be improved.
5. By the different location at which the spring 37 is assembled, a different effect of operation will be resulted. When the spring 37 is assembled between the convex ring 361 of the driven shaft 36 and the head cover 351 of the buffer seat 35, the operation can be only resulted when the driven part is given inward pressure. On the contrary, when the spring 37 is assembled between the convex ring 361 of the driven shaft 36 and the top assembly liner 38, the driving part and the driven part are given all-time pressure. This method can be used for filing and grinding and is a double effect that the conventional technology cannot achieve.

6. The driving part hits the driven part in a point-to-point manner, and therefore, the loss rate is small and the lifetime is long.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A reciprocal vibration type electric engraving pen, being driven by a main transmission shaft, comprising a rear shell, which is assembled with a front shell and is a hollow cylinder, with a rear end of the rear shell providing for the main transmission shaft to be positioned quickly, and an interior of the rear shell being assembled with a driving shaft, a first bearing, a second bearing, a collar, a small bearing and a C-shaped snap ring; with the driving shaft being transfixed respectively into the first bearing, the second bearing, the collar, the small bearing and the C-shaped snap ring; with a rear end of the driving shaft being a connection barrel to connect the main transmission shaft, a top front of the driving shaft being assembled with a driving bead, and the driving bead being off-centered on the top front of the driving shaft; and a front shell, which is a hollow cylinder and an interior of which is assembled with a buffer seat, a driven shaft, a spring, and a top assembly liner respectively, with the top assembly liner being assembled at a front end in the front shell to position the driven shaft in the front shell, a position of the driven shaft providing for abutting the spring, and a front end of the driven shaft being a chuck;

wherein a rear end of the driven shaft is assembled with a driven pillar, the driven pillar is radially arranged on the rear end of the driven shaft, the driven shaft provides for touching the driving bead at front of the driving shaft, the driving shaft and the connection barrel are integrally formed, and the driving shaft is driven directly by the main transmission shaft to rotate; when the main transmission shaft drives the driving shaft to rotate, the driving bead revolves on a circular track simultaneously; whereas when the driven shaft is at a withdraw position, the driving bead hits the driven pillar twice while revolving by one turn, thereby achieving the object of double vibration for the driven shaft.

2. The reciprocal vibration type electric engraving pen, according to claim 1, wherein a converged portion is disposed at a location close to a rear end of the rear shell, the converged portion is provided with a positioning slot, the positioning slot contains a steel ball, a C-shaped reed encloses the converged portion of the connection barrel, the C-shaped reed is provided with a small hole, an outer surface of the main transmission shaft is provided with a hole slot, the steel ball is positioned in the positioning slot, the steel ball is limited by the small hole of the C-shaped reed without moving outward, and the steel ball is locked in the locking slot of the main transmission shaft.

3. The reciprocal vibration type electric engraving pen, according to claim 1, wherein an inner wall in front of the rear shell is provided with an internal thread, an outer wall at rear of the front shell is provided with an external thread, an inner wall in front of the front shell is provided with an internal thread, the internal thread in front of the rear shell is assembled with the external thread at rear of the front shell, an outer periphery of the top assembly liner is provided with an external thread, the internal thread on the inner wall in front of the front shell is assembled with the external thread of the top assembly liner, and a surface of the front shell is provided with a corrugated mark.

4. The reciprocal vibration type electric engraving pen, according to claim 1, wherein an inner wall of the rear shell is provided with a baffle ring to stop the small bearing, the driving shaft is provided with a ring groove, and the C-shaped snap ring is locked in the ring groove of the driving shaft.

5. The reciprocal vibration type electric engraving pen, according to claim 1, wherein the connection barrel is provided with a locking slot, a periphery in front of the main transmission shaft is provided with an axial rib, and the axial rib is latched in the locking slot for engaging.

6. The reciprocal vibration type electric engraving pen, according to claim 1, wherein a top front of the driving shaft is provided with a round groove, the round groove provides for emplacing the driving bead, a periphery in front of the driving shaft is inserted with a stake, and the stake is transfixed into the driving bead to be engaged in the round groove.

7. The reciprocal vibration type electric engraving pen, according to claim 1, wherein a top rear of the driven shaft is provided radially with a semi-circular groove, and the semi-circular groove provides for inserting the driven pillar.

8. The reciprocal vibration type electric engraving pen, according to claim 1, wherein an inner wall of the front shell is provided with a flange ring, the buffer seat is a cylinder and is provided with a head cover, the head cover is abutted on the flange ring, and a convex ring is disposed on the driven shaft at a location close to the top assembly liner to provide for abutting the spring.

9. The reciprocal vibration type electric engraving pen, according to claim 8, wherein the spring is disposed between the convex ring and the top assembly liner to provide the driven shaft with a backward elastic force.

10. The reciprocal vibration type electric engraving pen, according to claim 8, wherein the spring is disposed between the convex ring and the head cover of the buffer seat to provide the driven shaft with a forward elastic force.

11. The reciprocal vibration type electric engraving pen, according to claim 1, wherein the chuck at front of the driven shaft is controlled by an adjustment clip, the chuck is provided with an external thread, the adjustment clip is provided with an internal thread, and the internal thread rotates the adjustment clip to control the inner diameter of the chuck.

* * * * *